G. STONE, dec'd.

M. D. Converse, A. H. Elliott, and H. C. Sergeant, Assignees by mesne Ass'mts of G. G. Stone, Administrator.

TOOL FOR DRAWING SPIKES.

No. 7,316. Reissued Sept. 26, 1876.

Marshil D Converse,
A. H. Elliott,
Henry C. Sergeant,
Assigns of Geo. G. Stone Adm.
of Geo. Stone per
Blanchard & Singleton Attest
H. S. Jewell
S. M. Pool

N. PETERS, PHOTO-LITHOGRAPHER, WASHINGTON, D. C.

UNITED STATES PATENT OFFICE.

MASCHIL D. CONVERSE, A. H. ELLIOTT, AND HENRY C. SERGEANT, OF NEW YORK, N. Y., ASSIGNEES, BY MESNE ASSIGNMENTS, OF GEORGE G. STONE, ADMINISTRATOR OF GEORGE STONE, DECEASED.

IMPROVEMENT IN TOOLS FOR DRAWING SPIKES.

Specification forming part of Letters Patent No. 46,154, dated January 31, 1865; reissue No. 7,316, dated September 26, 1876; application filed September 5, 1876.

*To all whom it may concern:*

Be it known that GEORGE STONE, now deceased, late of Boston, in the county of Suffolk and State of Massachusetts, did invent certain new and useful Improvements in Tools for Drawing Spikes; and we do hereby declare that the following is a full, clear, and exact description thereof, that will enable others skilled in the art to which it appertains to make and use the same, reference being had to the accompanying drawings, and to the letters of reference marked thereon, which form a part of this specification, in which—

Figure 1:
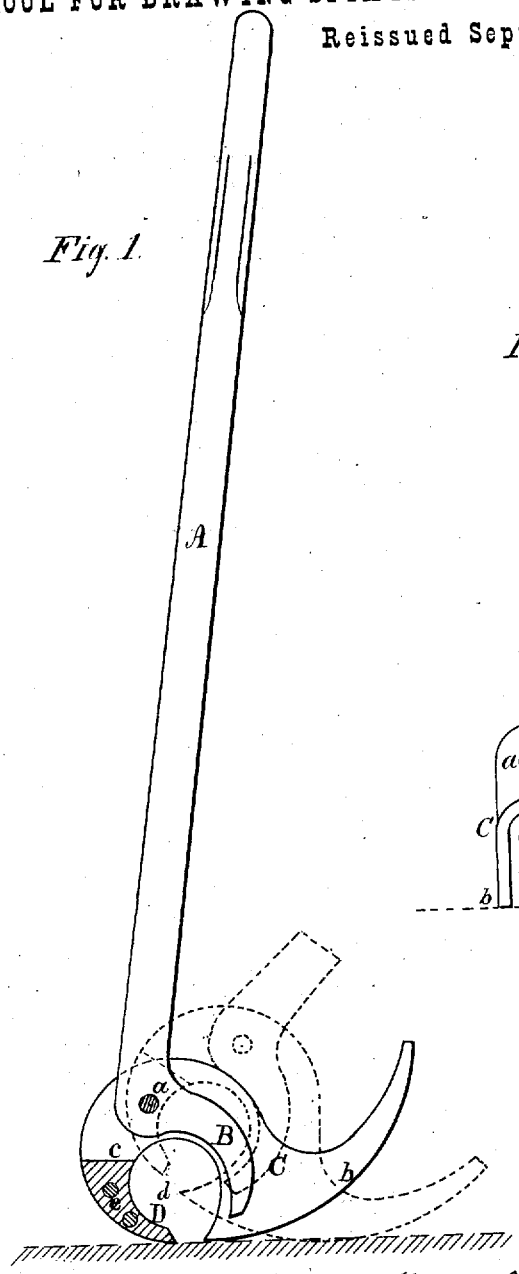
Figure 2:
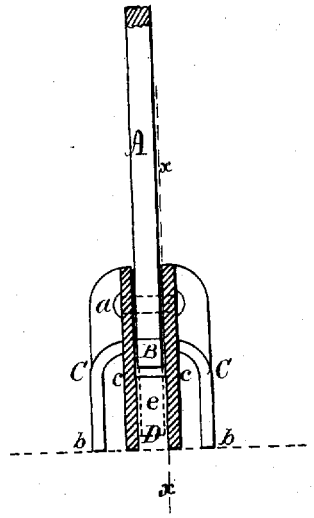

Figure 1 is a side sectional view of the invention, taken in the line *x x* of Fig. 2. Fig. 2 is a back view of the lower and principal portion of the same.

Similar letters of reference indicate like parts.

This invention relates to a new and improved implement or device for drawing spikes, large nails, pins, &c.; and it consists in the employment of a handle or lever, the lower end of which is provided or formed with a jaw of curved form, the handle or lever at its junction with the jaw being secured by a pivot-bolt to a rocker-shaped fulcrum, so constructed as to form a jaw, all being arranged in such a manner as to admit of spikes, nails, &c., being drawn with the greatest facility.

A represents a handle or lever, which may be of any required length, and is provided at its lower end with a jaw, B, which is of curved form, approximating to a semicircle, as shown clearly in Fig. 1. C represents a rocker-shaped fulcrum, to which the lower part of the handle or lever A, at its junction with the jaw B, is secured by a pivot-bolt *a*. The rocker portion of the fulcrum C is designated by *b*, and the other part *c* is curved in semicircular form, with a curved opening or space, *d*, between parts *c* and *b*, so that the part *c* forms a jaw, D, corresponding with, and constituting the fellow of the jaw B, the latter being curved in a reverse direction to the former, as shown clearly in Fig. 1. The two parts *c c*, Fig. 2, have a plate or block, *e*, riveted between them, so as to form a solid jaw.

The implement is used by adjusting the handle or lever A, so that the jaw B will be moved out from the other jaw D, and the implement is so adjusted to the spike or other article to be drawn that the jaws B and D will be at opposite sides of it. The handle or lever A is then moved in the direction indicated by the arrow, Fig. 1, and the jaws gripe the spike, and, by bearing down upon the handle or lever, the spike will be drawn, the rockers *b* serving as rolling fulcra, or automatically-changing fulcrum, and admitting of the easy drawing of the spike.

The whole arrangement is extremely simple and efficient, and it may be manufactured at a reasonable cost.

We claim as new and desire to secure by Letters Patent—

In an implement for drawing spikes and nails, the combination of a handle or lever, provided with a jaw upon its lower end, and curved or rolling fulcra, or automatically-changing fulcrum, to which is affixed a jaw to act in connection with the jaw upon the handle or lever, substantially as and for the purpose described.

In testimony that we claim the foregoing we have hereunto set our hands this 14th day of August, 1876.

M. D. CONVERSE,
ARVID HENRY ELLIOTT,
HENRY C. SERGEANT,
*Assignees.*

Witnesses:
D. W. STEPHENSON,
E. B. L. CARTER.